(No Model.)

W. A. LOUD.
THREE PART BEARING.

No. 305,396. Patented Sept. 16, 1884.

WITNESSES:
J. D. Garfield
John Davis.

INVENTOR
Waldo A. Loud
BY R. F. Hyde
ATTORNEY

UNITED STATES PATENT OFFICE.

WALDO A. LOUD, OF SPRINGFIELD, MASSACHUSETTS, ASSIGNOR TO THE BLAIR MANUFACTURING COMPANY, OF SAME PLACE.

THREE-PART BEARING.

SPECIFICATION forming part of Letters Patent No. 305,396, dated September 16, 1884.

Application filed June 30, 1884. (No model.)

*To all whom it may concern:*

Be it known that I, WALDO A. LOUD, a citizen of the United States, residing at Springfield, in the county of Hampden and State of Massachusetts, have invented new and useful Improvements in Three-Part Bearings, of which the following is a specification.

My invention consists in an improved three-part bearing, having for one part a solid case in which is recessed or partially embedded the other parts in the form of bars or gibs, having each one side in contact throughout its length with the shaft or journal, and adapted to be adjusted radially against said shaft by set-screws extending through the solid casing to its outside, the object of my invention being to provide a bearing for shafts, axles, and journals, in which all wear can be quickly taken up, and with more strength and certainty, from the movable parts being adjusted from and through a solid case forming the third bearing, so that in effect the composite bearing, when adjusted, becomes one solid bearing.

Figure 1:
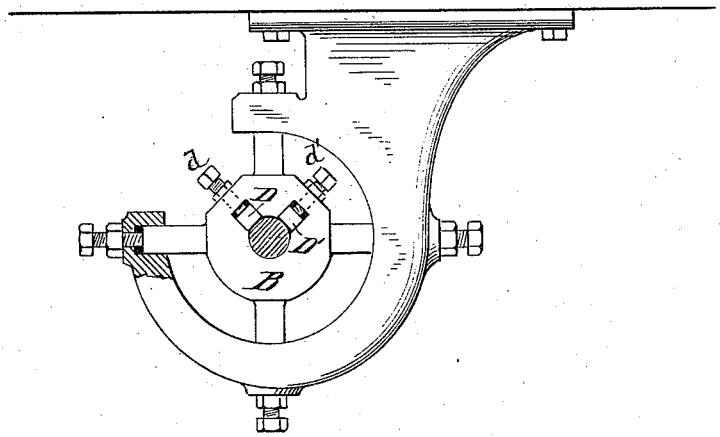
Figure 2:
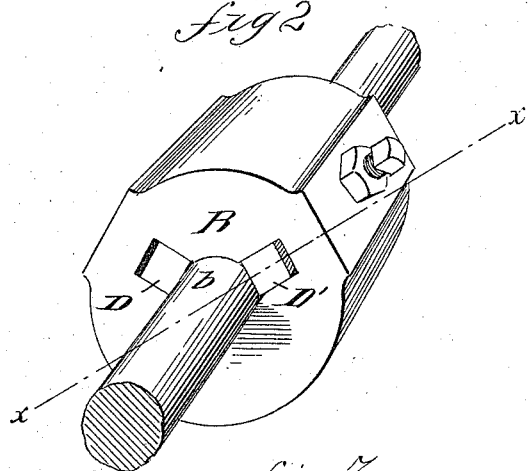
Figure 3:
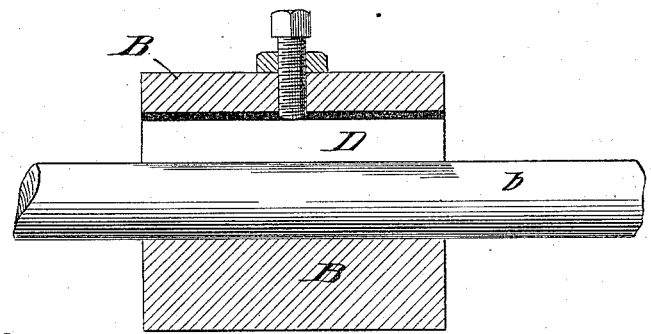
Figure 4:

In the drawings, Figure 1 shows the complete bearing adjustably arranged in a hanger. Fig. 2 is a perspective view of the complete bearing. Fig. 3 is a longitudinal section through the solid case, and Fig. 4 is one movable bearing-piece detached.

B is a solid case bored to the size of the shaft or journal $b$, and slotted radially to the axis of its bore, to receive the movable bearing-pieces D D'. The slots for receiving the gibs D D' are shown extending from the bearing-surface for a distance a little over one-half of the radius of the case B, thus leaving a thick outer wall, to insure the rigidity of case B. The pieces D D', having parallel sides and fitting in their recesses, as seen in Fig. 3, have set-screws $d$ $d'$ bearing upon their sides opposite the journal, and having nuts formed of the case B through which they pass, are capable of being set from the outside to cause the pieces D D' to form, with case B, a solid bearing.

Without a departure from the spirit of my invention, the bearing may be bisected to have one half removable as a cover, as is common in journal-bearings, the two sections being bolted through corresponding side lugs, or through the case itself, said bolts being arranged in the latter case so as not to interfere with the operating parts essential to the three-part bearing.

Two or more radially-operating pieces D may be used, though in practice I find two generally sufficient.

The recesses for the loose bearing-pieces D, extending, as shown, entirely through the part B, afford an easy means of removing and replacing the parts D.

Now, having described my invention, what I claim is—

The within-described improved three-part bearing, consisting of a bearing, B, having a solid periphery, radial slots from its bearing-surface, and set-screws communicating with said slots from the outside of part B, in combination with loose bearing-pieces fitted into said slots, and adapted to be moved therein to bear upon the journal by the screws, having the solid case B as their nut, to so bear the journal upon the solid case, as and for the purpose shown and described.

WALDO A. LOUD.

Witnesses:
R. F. HYDE,
J. D. GARFIELD.